United States Patent [19]
Iwazaki

[11] Patent Number: 6,073,244
[45] Date of Patent: Jun. 6, 2000

[54] POWER-SAVING CLOCK CONTROL APPARATUS AND METHOD

[75] Inventor: Yasuo Iwazaki, Tokyo, Japan

[73] Assignee: Mitsubishi Denki Kabushiki Kaisha, Tokyo, Japan

[21] Appl. No.: 09/128,969

[22] Filed: Aug. 4, 1998

[30] Foreign Application Priority Data

Dec. 24, 1997 [JP] Japan .................................. 9-354528

[51] Int. Cl.⁷ ...................................................... G06F 1/32
[52] U.S. Cl. ......................................... 713/322; 713/501
[58] Field of Search .................................... 713/320, 322, 713/323, 501, 601

[56] References Cited

U.S. PATENT DOCUMENTS

| | | |
|---|---|---|
| 4,095,267 | 6/1978 | Morimoto . |
| 5,142,247 | 8/1992 | Lada, Jr. et al. ........................... 331/14 |
| 5,493,684 | 2/1996 | Gephardt et al. . |
| 5,511,203 | 4/1996 | Wisor et al. .............................. 713/322 |
| 5,585,750 | 12/1996 | Noguchi et al. ..................... 713/321 X |
| 5,586,332 | 12/1996 | Jain et al. . |
| 5,628,001 | 5/1997 | Cepuran . |

FOREIGN PATENT DOCUMENTS

| | | |
|---|---|---|
| 0348045A2 | 12/1989 | European Pat. Off. . |
| 683756 | 3/1994 | Japan . |
| WO 9724653 | 7/1997 | WIPO . |

*Primary Examiner*—Thomas M. Heckler

[57] ABSTRACT

A clock control type information processing apparatus of the invention selects clock frequency according to load state, which reduces electric power consumption without substantially reducing the effective performance of the program. The clock control type information processing apparatus including a central processing unit for executing programs and a plurality of peripheral processing units connected to the central processing unit using a bus, includes a clock generating unit for generating clock signals having a plurality of frequencies and selectively supplying any one of the clock signals to the central processing unit and the peripheral processing units, a bus access monitoring unit for monitoring load state of the bus which connects the central processing unit with the peripheral processing units; and a clock selection control unit for generating control signals to control the clock frequencies generated by the clock generating unit according to the load state of the bus.

17 Claims, 10 Drawing Sheets

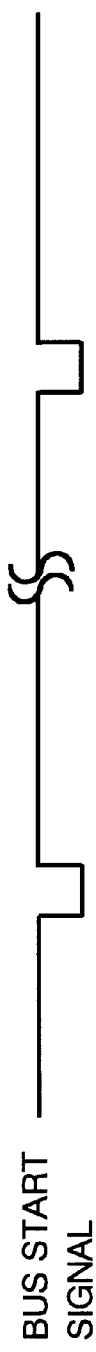
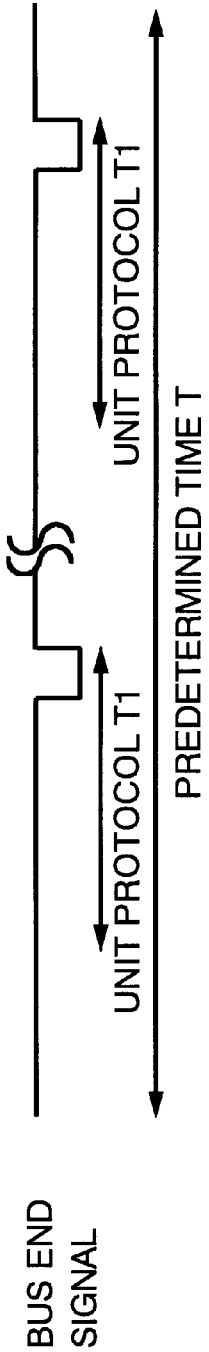
FIG. 2A CLOCK
FIG. 2B BUS START SIGNAL
FIG. 2C ADDRESS SIGNAL
FIG. 2D CONTROL SIGNAL
FIG. 2E DATA SIGNAL
FIG. 2F BUS END SIGNAL

POWER-SAVING CLOCK CONTROL APPARATUS AND METHOD

BACKGROUND OF THE INVENTION

1. Field of the Invention

The present invention relates to a clock control type information processing apparatus for switching a clock frequency and for controlling stop and restart of the clock signals supplied by clock generating units according to the load states of peripheral processing units and a central processing unit.

2. Description of the Prior Art

In an information processing apparatus, especially a portable personal computer, an important consideration is how to maintain the operating time longer under the environment for portable usage without being connected to a power adapter, that is, how to maintain the operating time longer by inner battery driving. Considering today's environmental issue, not only for a portable personal computer but also for all information processing apparatuses, it is important to make the electric power consumption of the units as low as possible. For example, since the electric power consumption of an information processing apparatus using CMOS logic becomes higher when the clock frequency of the device becomes higher, it has been suggested to reduce the clock frequency of the device, or to temporally stop the clock under a predetermined condition.

For example, Japanese Laid-open Publication 6-83756 discloses a clock control method as a system for reducing the electric power consumption of information processing apparatuses. The clock control method stops the clock according to the operating state for every function block, and starts the clock according to the control signal for operating the function block. FIG. 9 shows a conventional information processing apparatus for reducing the electric power consumption described in Japanese Laid-open Publication 6-83756.

FIG. 9 is a block diagram showing an example of a data processing apparatus illustrated in Japanese Laid-open Publication 6-83756. In FIG. 9, the data processing apparatus includes a micro processor 101, DMA unit 102, a memory 103, two peripheral processing units 31 and 32, an address bus (A) 105, a data bus (D) 106 and a control bus (C) 107 for connecting peripheral processing unit 31 or 32 with the micro processor 101, the DMA unit 102, and the memory 103. When DMA request signal REQ0 is output from the peripheral processing unit 31, the DMA unit 102 requests permission for DMA to the micro processor 101. When the permission is given, the DMA unit 102 transfers the data from the memory 103 to the peripheral processing unit 31 and from the peripheral processing unit 31 to the memory 103. This process also is applied to the peripheral processing unit 32 as well.

The micro processor 101 carries out the data processing according to the programmed contents by sending and receiving data between the memory 103 and the peripheral processing unit 31 or 32 via the address bus (A) 105, the data bus (D) 106 and the control bus (C) 107. When the DMA request signal HREQ is output from the DMA unit 102, the micro processor 101 stops the processing to generate DMA permission signal HACK and supplies it to the DMA unit 102.

FIG. 10 shows the DMA unit 102, which includes a transfer request control unit 111, a clock control unit 112, first channel control unit 113 and a second channel control unit 114. The DMA unit 102 outputs the DMA request signal HREQ to the micro processor 101 when the DMA request signal REQ0 or REQ1 are output from the peripheral processing unit 31 or 32, respectively. The DMA unit 102 supplies the clock signal to any one of the first channel control unit 113 and the second channel control unit 114 to transfer the data from the memory 103 to the peripheral processing unit 31 or 32, or from the peripheral processing unit 31 or 32 to the memory 103, according to the DMA permission signal HACK output from the micro processor 101.

The transfer request control unit 111 operates the clock control unit 112 so that the clock control unit 112 supplies the first clock signal only to the first channel control unit 113 when the DMA request signal REQ0 for requesting the DMA transfer of the first channel's side is output from the peripheral processing unit 31. The transfer request control unit 111 operates the clock control unit 112 so that the clock control unit 112 supplies the second clock signal only to the second channel control unit 114 when the DMA request signal REQ1 for requesting the DMA transfer of the second channel's side is output from the peripheral processing unit 32. On the other hand, the transfer request control unit 111 operates the clock control unit 112 so that the clock control unit 112 stops output of the first clock signal corresponding to the first channel control unit 113 and the second clock signal corresponding to the second channel control unit 114, respectively, when the DMA request signal REQ0 and REQ1 are not output from the peripheral processing unit 31 or 32.

When the transfer request control unit 111 receives the signal indicating the transfer termination from the first channel control unit 113 and the second channel control unit 114, the transfer request control unit 111 operates the clock control unit 112 so that the clock control unit 112 stops the clock signals supplied to the first channel control unit 113 or the second channel control unit 114.

A method for controlling the clock frequency according to the processing load state of the central processing unit which executes the program is also suggested.

As mentioned above in connection with the conventional information processing apparatus, there are the following problems. First, in the information processing apparatus for controlling the clock according to the processing load of the central processing unit, the clock signals supplied to the peripheral processing units can not be stopped or can not be reduced even when the peripheral processing units are inactive, if the central processing unit executes the program with high processing load. The construction described in the Japanese Laid-open Publication 6-83756 requires a detector for detecting an operating state for every function block. In other words, the increase of the function blocks causes the increase of the circuits for detecting the operating states. Therefore, the construction needs increased electric power consumption as a whole system.

SUMMARY OF THE INVENTION

It is an object of the present invention to provide a clock control type information processing apparatus for supplying clock signals in response to the processing load states of the central processing unit and the peripheral processing units, without depending only on the processing load state of the central processing unit.

It is a further object of the present invention to provide a clock control type information processing apparatus for reducing electric power consumption by controlling clock frequencies supplied to the central processing unit and the peripheral processing units when no accessing is detected on the bus.

It is a still further object of the present invention to provide a clock control type information processing apparatus for reducing electric power consumption by completely stopping supply of respective clock signals to the central processing unit and the peripheral processing units when no accessing is detected on the bus.

It is a further object of the present invention to provide a clock control type information processing apparatus for reducing electric power consumption by controlling clock frequencies supplied to the central processing unit and the peripheral processing units according to the load states of the central processing unit and the peripheral processing units.

It is a further object of the present invention to provide a clock control type information processing apparatus for reducing electric power consumption by controlling clock frequencies supplied to the central processing unit and the peripheral processing units, by completely stopping supply of clock signals to the central processing unit when no load is detected in the central processing unit.

It is a further object of the present invention to provide a clock control type information processing apparatus for reducing electric power consumption by controlling clock frequencies supplied to the central processing unit and the peripheral processing units, by completely stopping to supply of clock signals to the peripheral processing units when no accessing is detected on the bus.

It is a further object of the present invention to provide a clock control type information processing apparatus for reducing electric power consumption by controlling clock frequencies supplied to the central processing unit and the peripheral processing units, by completely stopping supply of clock signals to the central processing unit when no load is detected in the central processing unit, and completely stopping supply of clock signals to the peripheral processing units when no accessing is detected on the bus.

It is a further object of the present invention to provide a clock generating unit for setting oscillation frequencies by controlling the frequencies of a voltage controlling oscillator (VCO), thereby effectively reducing the electric power consumption of the information processing apparatus.

It is a further object of the present invention to provide a clock generating unit which comprises a plurality of oscillators for setting a oscillation frequency by selecting one of the oscillators, thereby effectively reducing the electric power consumption of the information processing apparatus.

According to a first aspect of the invention, a clock control type information processing apparatus including a central processing unit for executing programs and a plurality of peripheral processing units connected to the central processing unit using a bus includes a clock generating unit for generating clock signals having a plurality of frequencies and selectively supplying any one of the clock signals to the central processing unit and the peripheral processing units; a bus access monitoring unit for monitoring load state of the bus which connects the central processing unit with the peripheral processing units; and a clock selection control unit for generating control signals to control the clock frequencies generated by the clock generating unit according to the load state of the bus.

According to a second aspect of the invention, the first clock control type information processing apparatus further includes a clock stop control unit for instructing the clock generating unit to stop clock signal generation when the bus access monitoring unit detects no bus access on the bus for a predetermined time; and a clock restart control unit for instructing the clock generating unit to restart clock signal generation in response to restart signals when the clock is stopped.

According to a third aspect of the invention, a clock control type information processing apparatus including a central processing unit for executing the programs and a plurality of peripheral processing units connected to the central processing unit using a bus includes a first clock generating unit for generating clock signals having a plurality of frequencies and selectively supplying any one of the clock signals to the peripheral processing units; a second clock generating unit for generating clock signals having a plurality of frequencies and selectively supplying any one of the clock signals to the central processing unit; a bus access monitoring unit for monitoring the load state of the bus which connects the central processing unit with the peripheral processing units; a first clock selection control unit for generating control signals to switch clock frequencies of the first clock generating unit according to load state of the bus; and a second clock selection control unit for generating control signals to switch clock frequencies of the second clock generating unit according to load state of the central processing unit.

According to a fourth aspect of the invention, the clock control type information processing apparatus further includes a second clock stop control unit for instructing the second clock generating unit to stop clock signal generation when the central processing unit detects no load for more than a predetermined time; and a second clock restart control unit for instructing the second clock generating unit to restart clock signal generation in response to restart signals when the clock signals of the second clock generating unit are stopped.

According to a fifth aspect of the invention, the clock control type information processing apparatus further includes a clock stop control unit for instructing the clock generating unit to stop clock signal generation when the bus access monitoring unit detects no bus access on the bus for more than a predetermined time; and a clock restart control unit for instructing the first clock generating unit to restart clock signal generation in response to restart signals when the clock signals of the first clock generating unit are stopped.

According to a sixth aspect of the invention, the clock control type information processing apparatus further includes a second clock stop control unit for instructing the second clock generating unit to stop clock signal generation when the central processing unit detects no load for more than the predetermined time; and a second clock restart control unit for instructing the second clock generating unit to restart clock signal generation in response to restart signals when the clock signals of the second clock generating unit are stopped.

According to a seventh aspect of the invention, the clock generating unit sets oscillation frequencies by controlling the frequencies of a voltage controlling oscillator (VCO).

According to an eighth aspect of the invention, the clock generating unit comprises a plurality of oscillators for setting a oscillation frequency by selecting one of the oscillators.

BRIEF DESCRIPTION OF THE DRAWINGS

The present invention will become more fully understood by the accompanying drawings which are given by way of illustration only, and thus are not limitative of the present invention and wherein:

FIGS. 2A–2F are timing charts of bus access in the first embodiment of the present invention;

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Embodiment 1

Figure 1:
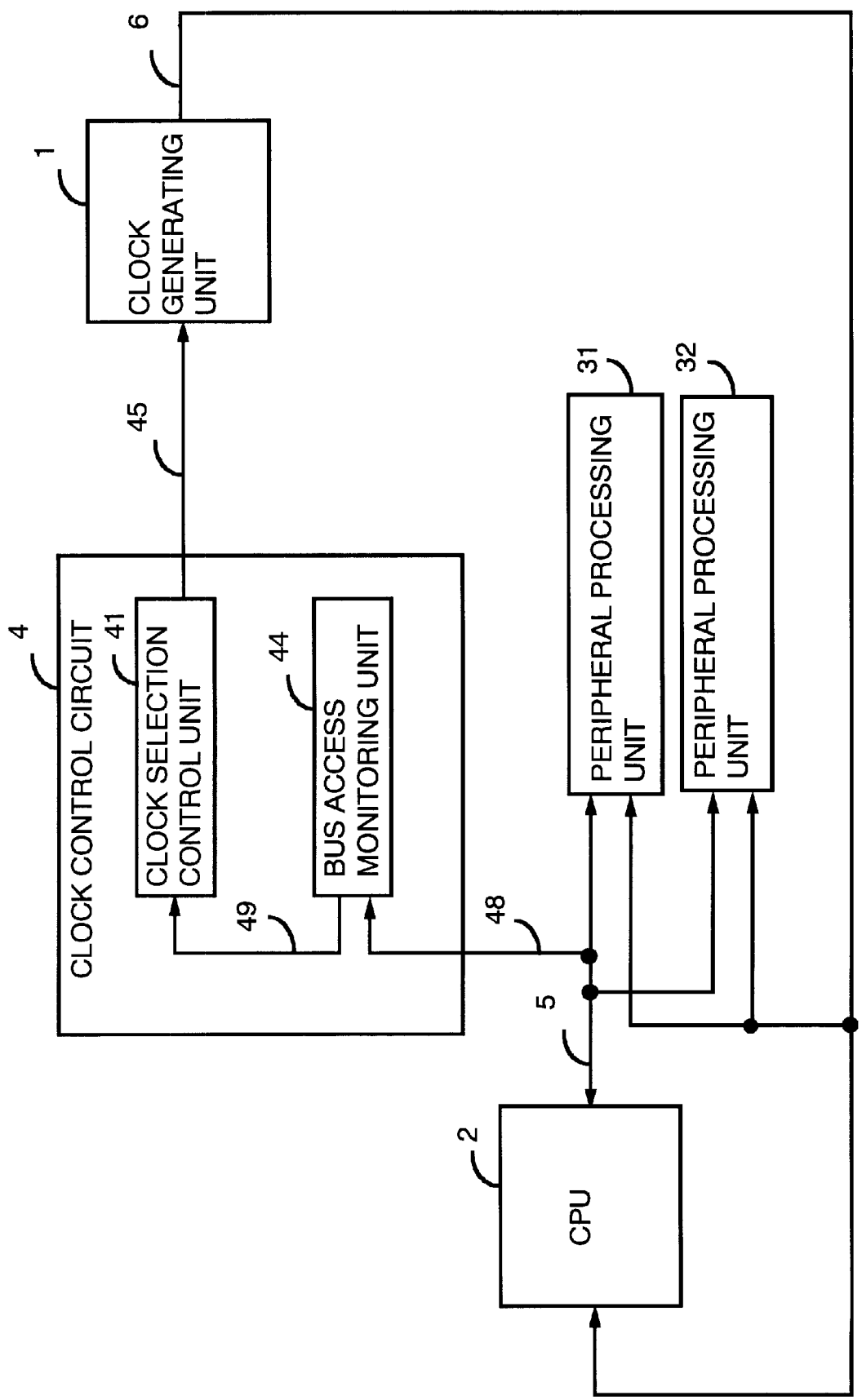
FIG. 1 is a block diagram of a clock control type information processing apparatus of a first embodiment of the present invention.

A clock control type information processing apparatus of a first embodiment of the present invention is explained in detail using FIG. 1. FIG. 1 is a block diagram showing a clock control type information processing apparatus of the first embodiment of the present invention. The clock control type information processing apparatus of FIG. 1 includes a clock generating unit 1 for generating clock signals having a plurality of different kinds of frequencies, a central processing unit (CPU) 2, peripheral processing units 31 and 32, a clock control circuit 4, a bus 5 for connecting the central processing unit 2 with peripheral processing units 31 and 32, a clock signal wire 6 for sending a clock signal selected by the clock generating unit, a clock selection control unit 41 for selecting any one of the clock signals having a plurality of frequencies, a bus access monitoring unit 44 for monitoring the load state of the bus 5, a signal wire 45 for providing an output signal output from the clock selection control unit 41 and a monitor signal wire 48 for connecting the bus access monitoring unit 44 and the bus 5.

An information processing apparatus generally executes a plurality of programs by time sharing. However, these programs are often in a state for waiting the data input. Therefore, the information processing apparatus is not always in the active state. For example, the peripheral processing unit 31 or 32 sometimes does not carry out processing when the central processing unit 2 is executing the program, and the peripheral processing unit 31 or 32 sometimes carries out some processing, when the central processing unit 2 is not operating due to no programs to be executed. Further, the central processing unit 2 and the peripheral processing unit 31 or 32 sometimes are not carrying out processing. In other words, upon executing the program, the state of the information processing apparatus is not always fixed. The information processing apparatus has two states, namely, an active state and an inactive state. The object of the clock control type information processing apparatus of the first embodiment of the present invention is to detect the inactive state of the peripheral processing units 31, 32 by monitoring an accessing state of the bus 5 and to reduce the electric power consumption during the inactive time.

FIGS. 2A–2F show timing charts for accessing the bus in the first embodiment of the present invention. FIG. 2A is a timing chart of a clock of the central processing unit 2, FIG. 2B is a timing chart of a bus start signal output from the central processing unit 2, FIG. 2C is a timing chart of an address signal output from the central processing unit 2, FIG. 2D is a timing chart of a control signal output from the central processing unit 2, FIG. 2E is a timing chart of a data output from the central processing unit 2 and FIG. 2F is a timing chart of a bus end signal output from the central processing unit 2. In FIG. 1, when the central processing unit 2 accesses the peripheral processing unit 31 or 32, bus protocols occur as shown in FIGS. 2A–2F. The bus access monitoring unit 44 monitors these protocols, for example, the bus start signal via the monitor signal wire 48, occurring on the bus, and switches the clock frequency based on the result of monitoring the bus protocol during the predetermined time (T) including a plurality of unit bus protocol time (T1). In other words, the bus access monitoring unit 44 informs the clock selection control unit 41 of the load state of the peripheral processing units 31, 32 monitored by the monitor signal wire 48 via a control wire 49. The clock selection control unit 41 instructs the clock generating unit 1 to select the appropriate clock frequency via the signal wire 45. The clock generating unit 1 supplies the clock signals with the instructed frequency to the central processing unit 2 and the peripheral processing unit 31 or 32 via a clock signal wire 61.

Figure 3:
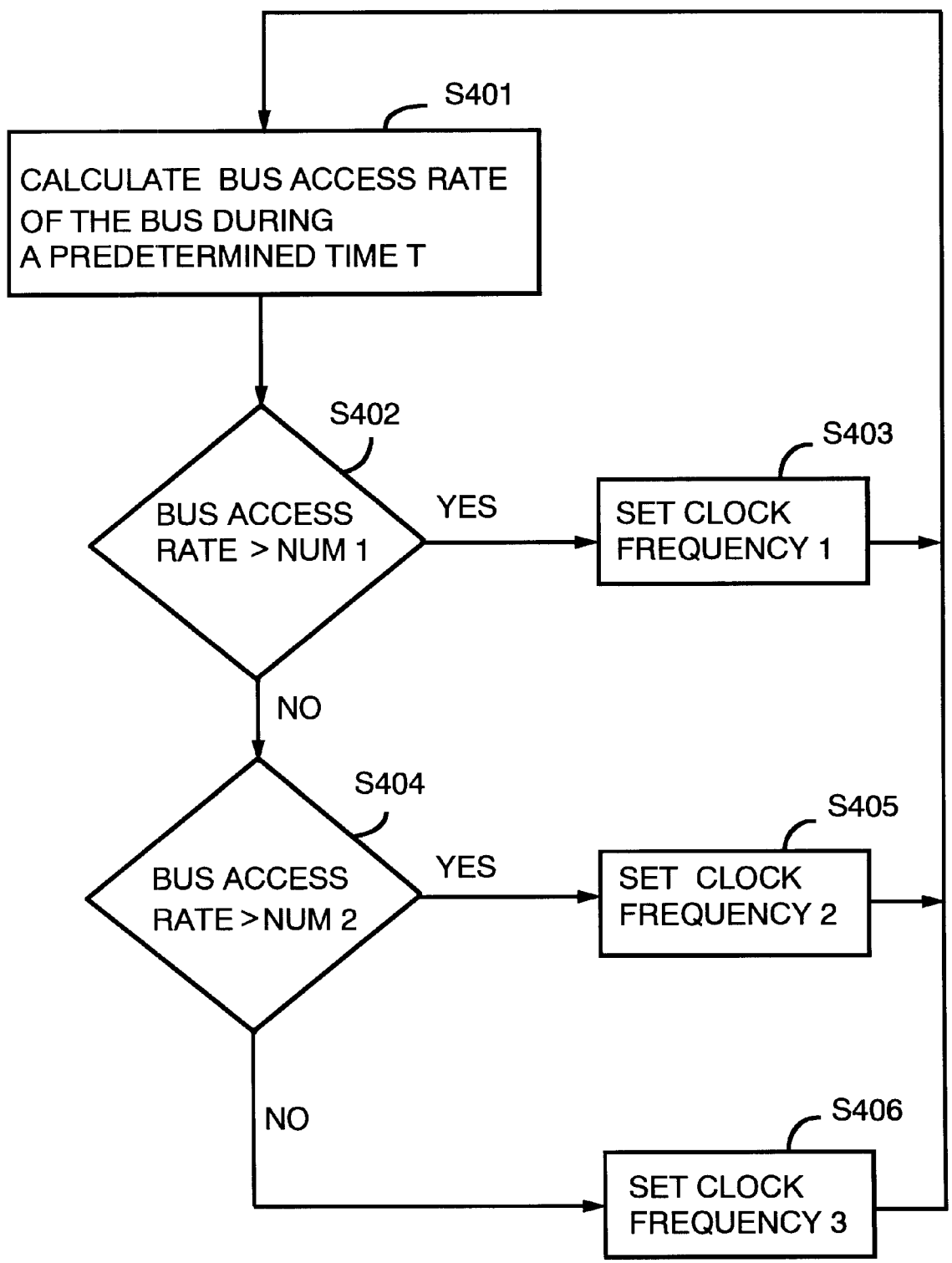
FIG. 3 is a flowchart for selecting the clock frequency in the first embodiment of the present invention.

FIG. 3 is a flowchart for selecting a clock frequency using the clock selection control unit 41 shown in FIG. 1. The clock frequency number n supplied to the information processing apparatus is assumed as n=3 in FIG. 3. If the clock frequency number n is more than three, it can be explained as well by increasing the comparing steps. The operation of the clock control type information processing apparatus of the first embodiment of the present invention is explained using FIG. 1 and FIG. 3. In a step S401 of FIG. 3, the bus access monitoring unit 44 of FIG. 1 monitors the number of the bus protocols passing over the bus which connects the central processing unit 2 and the peripheral processing unit 31 or 32 (for example, the number of the bus start) during a predetermined time and calculates the number of bus protocols (bus access rate) for a predetermined monitoring time T. In a step S402, the value obtained in the step S401, namely, the bus access rate is compared with a predetermined value NUM1. If the bus access rate is detected to be larger than NUM1 in the step S402, the clock generating unit 1 sets a clock frequency 1. If the bus access rate is detected to be equal or less than NUM1 in the step S402, the state goes to a step S404.

In the step S404, the bus access rate is compared with a predetermined value NUM2. If the buss access rate is detected to be larger than NUM2 in the step S404, the clock generating unit 1 sets a clock frequency 2. If the bus access rate is detected to be equal or less than NUM2 in the step S404, the clock generating unit 1 sets the clock frequency 3. The values to be compared are assumed to be in descending order, namely, NUM1 is assumed to be larger than NUM2. Among three kinds of the clock frequencies, the clock frequency 1 is the highest, the clock frequency 2 is the middle and the clock frequency 3 is the lowest. After setting the optimum clock frequency, the process goes back to the step S401 and selects the optimum clock frequency again for every predetermined time. In this way, the process is repeated over and over.

The clock generating unit 1 may change the generating frequency by controlling the frequency of a voltage control oscillator (VCO) or may set the oscillation frequency by selecting one of a plurality of oscillators.

According to the first embodiment, the clock frequency is selected in response to the load state of the peripheral processing unit and the electric power consumption of the information processing apparatus can be reduced without substantially reducing the effective performance for executing the program.

Embodiment 2

The clock control type information processing apparatus of the first embodiment of the present invention is constructed so that it increases the clock frequency in the clock generating unit 1 when the load of the bus increases, and reduces the clock frequency in the clock generating unit 1 when the load of the bus decreases, by monitoring the load state by the bus access of the peripheral processing unit 31. A clock control type information processing apparatus of a second embodiment of the present invention adds a function to stop the clock signal generation in the clock generating unit 1 when the peripheral processing unit 31 or 32 is not operating, and a function to restart the clock signal generation in the clock generating unit 1 when the peripheral processing unit 31 or 32 begins to operate.

Figure 4:
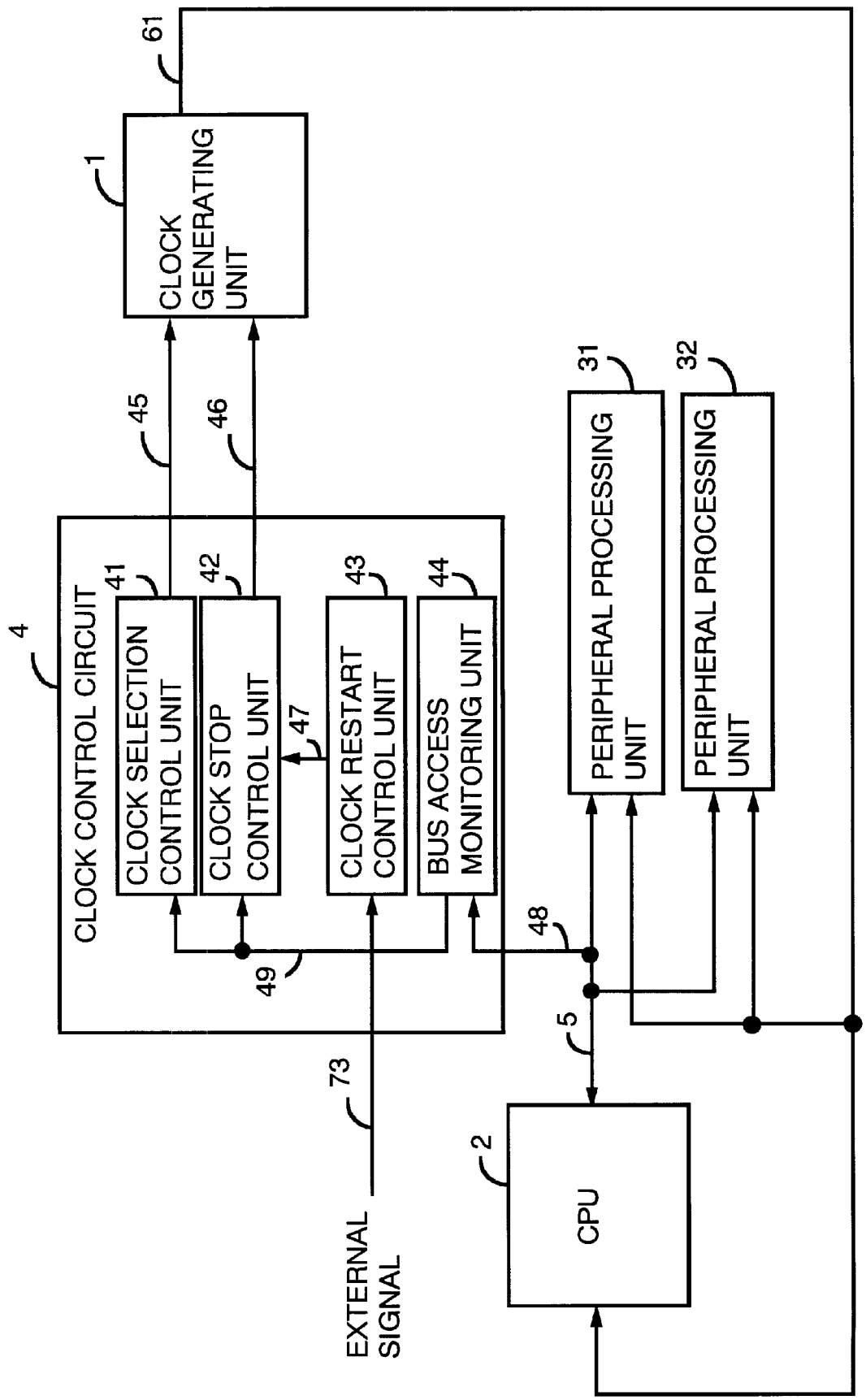
FIG. 4 is a block diagram of a clock control type information processing apparatus of a second embodiment of the present invention.

The clock control type information processing apparatus of the second embodiment of the present invention is explained in detail using FIG. 4. FIG. 4 is a block diagram showing a clock control type information processing apparatus of the second embodiment of the present invention. The clock control type information processing apparatus of FIG. 4 includes a clock generating unit 1 for generating clock signals having a plurality of different frequencies, a central processing unit (CPU) 2, peripheral processing units 31 and 32, a clock control circuit 4, a bus 5 for connecting the central processing unit 2 and peripheral processing units 31 and 32, a clock signal wire 6 for sending clock signals selected by the clock generating unit 1, a clock selection control unit 41 for selecting any one of the clock signals having a plurality of frequencies, a clock stop control unit 42 for controlling the stop of the clock signals which are generated by the clock generating unit 1, a clock restart control unit 43 for restarting the stopped clock signals, a bus access monitoring unit 44 for monitoring the load state of the bus 5, a signal wire 45 for providing an output signal output from the clock selection control unit 41, a monitor signal wire 48 for monitoring the bus 5, and an external signal wire 73 which is input from outside for restarting the clock signal generation.

The clock control type information processing apparatus of the second embodiment of the present invention changes the frequency of the clock generating unit by monitoring the accessing state of the bus 5. The clock control type information processing apparatus of the second embodiment stops the clock signal generation in the clock generating unit 1 when the peripheral processing units 31, 32 are inactive, and restarts the clock signal generation of the clock generating unit 1 when the peripheral processing units 31, 32 start to operate. Therefore, it is possible to reduce the electric power consumption still more while the peripheral processing units 31, 32 are inactive.

Timing charts of a bus access in the second embodiment of the present invention are also shown in FIGS. 2A–2F as well as in the first embodiment of the present invention. The bus access monitoring unit 44 monitors the bus, and the clock selection control unit 41 controls the clock generating unit 1 based on the monitored result of the bus access monitoring unit 44. This operation is the same as that in the first embodiment, so the explanation thereof is omitted.

The clock stop control and the clock restart control which are the specific features of the second embodiment are explained. If the bus access monitoring unit 44 detects no bus access during a predetermined time, the bus access monitoring unit 44 informs the clock stop control unit 42 via a control wire 49 that it detects no bus access. The clock stop control unit 42 instructs the clock generating unit 1 to stop the clock via the signal wire 46. As the result, the clock generating unit 1 stops the clock signal supply to the central processing unit 2 and the peripheral processing units 31 and 32.

On the other hand, if the clock restart control unit 43 receives the information that the peripheral processing unit 31 or 32 restarts its operation via the signal wire 73 from outside, the clock restart control unit 43 instructs the clock stop control unit 42 to cancel the clock stop via a signal wire 47. The clock stop control unit 42 instructs the clock generating unit 1 to restart the clock signal supply to the central processing unit 2 and the peripheral processing unit 31 or 32 via the signal wire 46. The clock restart control unit 43 may directly control the clock generating unit 1 to control the clock restart not via the clock stop control unit 42. The clock generating unit 1 supplies the clock signal to the central processing unit 2 and the peripheral processing units 31 and 32 via a clock signal wire 61.

The clock generating unit 1 may change the generating frequency by controlling the frequency of the voltage control oscillator (VCO) or may set the oscillation frequency by selecting one of a plurality of oscillators.

According to the second embodiment of the present invention, the clock frequency is selected in response to the load state. Therefore, when the operation of the central processing unit and the peripheral processing units are completely stopped due to no load for both units, the electric power consumption of the information processing apparatus can be further reduced.

Embodiment 3

The clock control type information processing apparatus of the first embodiment of the present invention is constructed so that it increases the clock frequency in the clock frequency 1 when the load of the bus increases, and reduces the clock frequency in the clock generating unit 1 when the load of the bus decreases, by monitoring the load state by the bus access of the peripheral processing units 31 and 32. A clock control type information processing apparatus of a third embodiment of the present invention adds a function to monitor the load state of the central processing unit 2, and to increase the clock frequency of the clock generating unit when the load of the central processing unit 2 increases, and to decrease the clock frequency of the clock generating unit when the load of the central processing unit 2 decreases.

Figure 5:
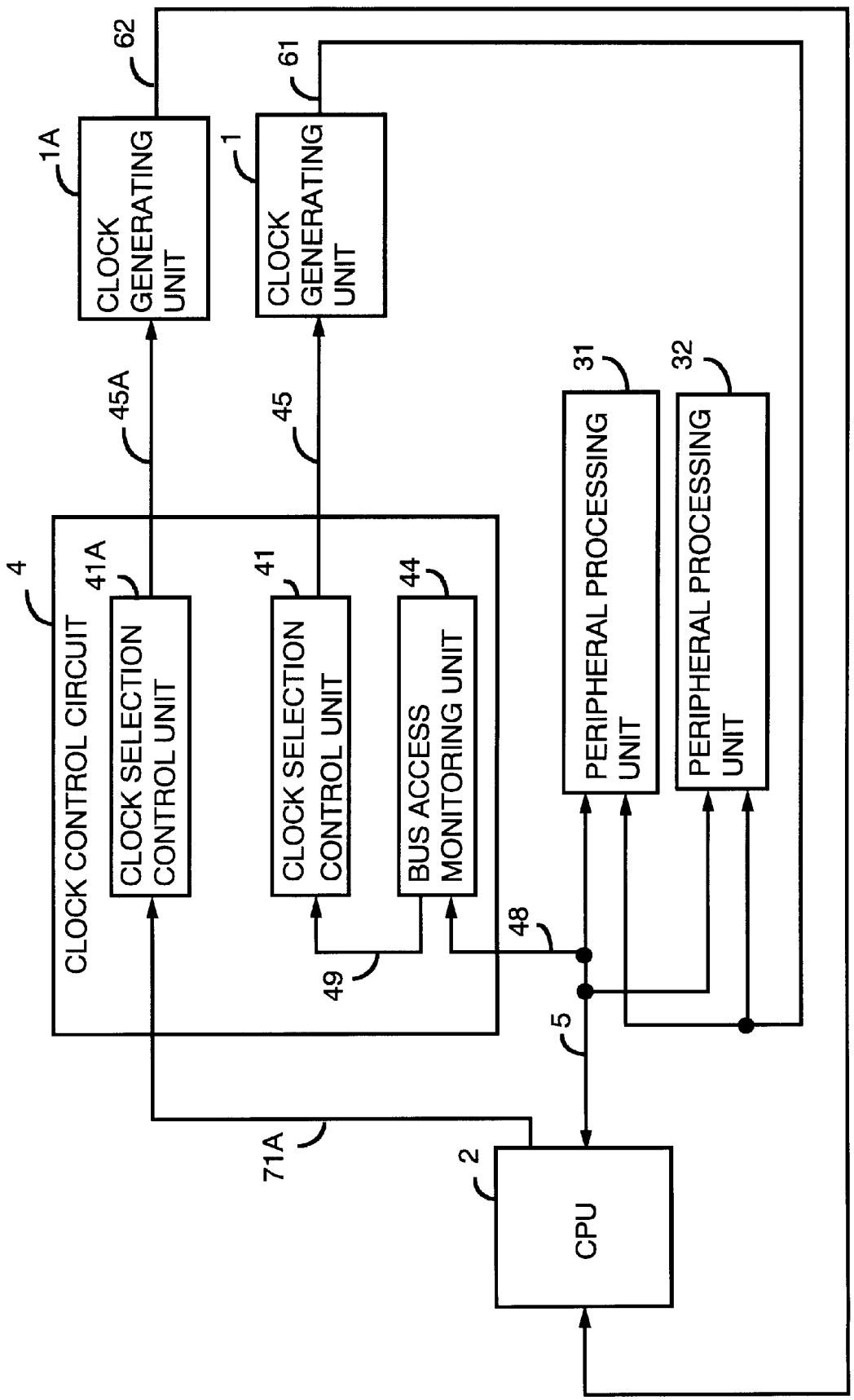
FIG. 5 is a block diagram of a clock control type information processing apparatus of a third embodiment of the present invention.

The clock control type information processing apparatus of the third embodiment of the present invention is explained in detail using FIG. 5. FIG. 5 is a block diagram showing a clock control type information processing apparatus of the third embodiment of the present invention. The clock control type information processing apparatus of FIG. 5 includes a first clock generating unit 1 for generating clock signals having a plurality of different frequencies and supplying the clock signals selectively to the peripheral processing units 31 and 32, a central processing unit (CPU) 2, a second clock generating unit 1A for generating clock signals having a plurality of different frequencies and supplying the clock signals selectively to the central processing unit 2, peripheral processing units 31 and 32, a clock control circuit 4, a bus 5 for connecting the central processing unit 2 and peripheral processing units 31 and 32, a first clock signal wire 61 for sending the clock signals selected by the first clock generating unit 1 to the peripheral processing units 31 and 32, a second clock signal wire 62 for sending the clock signals selected by the second clock generating unit 1A to the central processing unit 2, a clock selection control unit 41 for selecting the clock frequency for the peripheral processing units 31, 32, a clock selection control unit 41A for selecting the clock frequency for the central processing units 2, a bus access monitoring unit 44 for monitoring the load state of the bus 5, a signal wire 45 for providing an output signal output from the first clock selection control unit 41, a signal wire 45A for providing an output signal output from the second clock selection control unit 41A and a monitor signal wire 48 for monitoring the bus 5.

The clock control type information processing apparatus of the third embodiment of the present invention changes the frequency of the first clock generating unit and the second clock generating unit, respectively, by monitoring the load state of the central processing unit 2 and the peripheral processing units 31 and 32. Therefore, it is possible to reduce the electric power consumption still more when the central processing unit 2 and the peripheral processing units 31, 32 are inactive.

Timing charts of a bus access in the third embodiment of the present invention are also shown in FIGS. 2A–2F as well as in the first embodiment of the present invention. The bus access monitoring unit 44 monitors the bus 5, and the clock selection control unit 41 controls the clock generating unit 1. Based on the monitoring result, the clock generating unit 1 controls the clock frequency supplied to the peripheral processing unit 31 or 32. This operation is the same as that in the first embodiment, so the explanation thereof is omitted.

The third embodiment of the present invention is different from the first embodiment of the present invention as follows. In the first embodiment of the present invention, the clock frequency supplied from the clock generating unit 1 to the central processing unit 2 and the peripheral processing units 31 and 32 are commonly controlled, however, in the third embodiment, the clock frequency supplied from the clock generating unit 1A to the central processing unit 2 and the clock frequency supplied from the clock generating unit 1 to the peripheral processing units 31 and 32 are separately controlled.

A method for controlling the clock frequency according to the load state of the central processing unit 2 of the clock control type information processing apparatus in the third embodiment of the present invention, which is a specific feature, is explained. A clock selection control unit 41A receives the information regarding the load state from the central processing unit 2 to determine an appropriate clock frequency to be generated by the clock generating unit 1A, and instruct the clock generating unit 1A to generate the appropriate clock frequency. For example, the clock frequency of the central processing unit 2 must be higher when the load thereof is larger and the clock frequency of the central processing unit 2 may be lower when the load thereof is smaller. Accordingly, the electric power consumption of the central processing unit 2 can be reduced by reducing the frequency to be generated by the clock generating unit 1A when the load of the central processing unit 2 is smaller.

The clock generating units 1 and 1A may control the frequency of the voltage control oscillator (VCO) to change the clock frequency, or may include a plurality of oscillators to select a clock frequency by selecting one of the oscillators.

According to the third embodiment of the present invention, the respective clock frequencies of the central processing unit and the peripheral processing units are selected in response to the respective load states of the central processing unit and the peripheral processing units. Therefore, the electric power consumption of the information processing apparatus can be reduced.

Embodiment 4

The clock control type information processing apparatus of the third embodiment of the present invention is constructed so that it increases the clock frequencies in the respective clock generating units when the loads of the central processing unit 2 and the peripheral processing unit 31 or 32 increase, and reduce the clock frequencies in the respective clock generating units when the loads of the central processing unit 2 and the peripheral processing unit 31 or 32 decreases, by monitoring the load state of the central processing unit 2 and the peripheral processing units 31 and 32. A clock control type information processing apparatus of the fourth embodiment of the present invention adds a function to stop the clock signal generation of the clock generating unit 1A when the central processing unit 2 is inactive, and to restart the clock signal generation of the clock generating unit 1A when the central processing unit 2 starts to operate.

Figure 6:
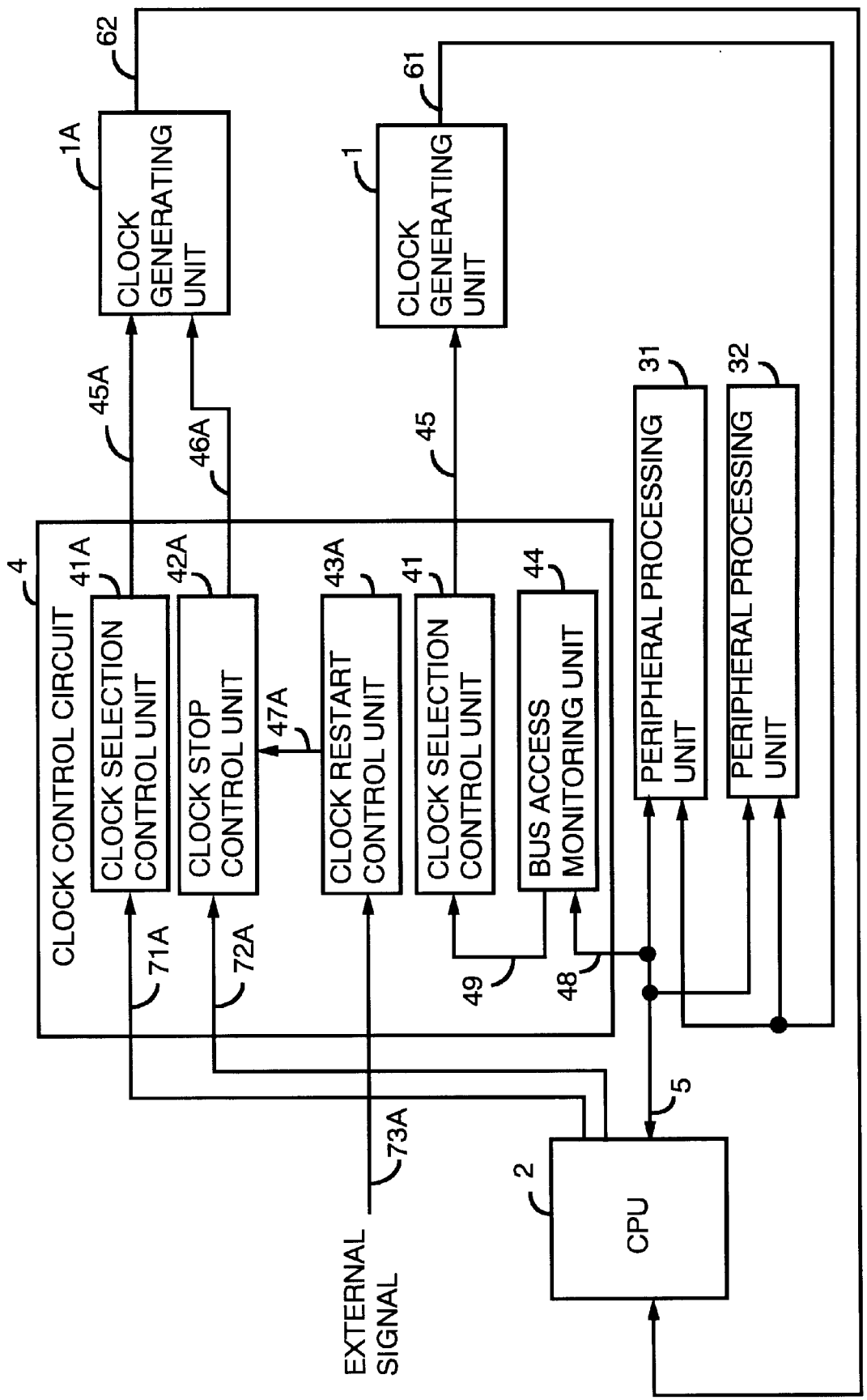
FIG. 6 is a block diagram of a clock control type information processing apparatus of a fourth embodiment of the present invention.

The clock control type information processing apparatus of the fourth embodiment of the present invention is explained in detail using FIG. 6. FIG. 6 is a block diagram showing a clock control type information processing apparatus of the fourth embodiment of the present invention. The clock control type information processing apparatus of FIG. 6 includes a first clock generating unit 1 for generating clock signals having a plurality of different frequencies, a second clock generating unit 1A for generating clock signals having a plurality of different frequencies, a central processing unit (CPU) 2, peripheral processing units 31 and 32, a clock control circuit 4, a bus 5 for connecting the central processing unit 2 and peripheral processing units 31 and 32, a first clock signal wire 61 for sending the clock signals selected by the first clock generating unit 1, a second clock signal wire 62 for sending the clock signals selected by the second clock generating unit 1A, a first clock selection control unit 41 for selecting the clock frequency for the peripheral processing units 31, 32, a second clock selection control unit 41A for selecting the clock frequency for the central processing unit 2, a clock stop control unit 42A for controlling the stop of the clock signals to be generated in the clock generating unit 1A, a clock restart control unit 43A for restarting the clock signals generation which has been stopped, a bus access monitoring unit 44 for monitoring the load state of the bus 5, a signal wire 45 for providing an output signal output from the first clock selection control unit 41, a signal wire 45A for providing an output signal output from the second clock selection control unit 41A, a signal wire 46A for providing an output signal output from the clock stop control unit 42A, a monitor signal wire 48 for monitoring the bus 5, a control wire 49 for sending information signal from the bus access monitoring unit 44 to the clock selection control unit 41, an external signal wire 73A for receiving external signal for restarting the generation of the clock signals supplied to the central processing unit 2, a signal wire 71A for informing the load state of the central processing unit 2, and a signal wire 72A for informing an inactive state of the central processing unit 2.

The clock control type information processing apparatus of the fourth embodiment of the present invention monitors the active state of the central processing unit, and changes the frequency of the clock generating unit. Further, the clock control type information processing apparatus of the fourth embodiment stops the clock signal generation of the clock generating unit when the central processing unit is inactive and restarts the clock signal generation of the clock generating unit when the central processing unit restarts to operate. Therefore, it is possible to reduce the electric power consumption still more while the central processing unit is inactive.

Timing charts of a bus access in the fourth embodiment of the present invention are also shown in FIGS. 2A–2F as well as in the first embodiment of the present invention. The bus access monitoring unit 44 monitors the bus 5, and the clock selection control unit 41 controls the clock generating unit 1 based on the monitored result of the bus access monitoring unit 44. This operation is the same as that in the first embodiment, so the explanation thereof is omitted.

The clock stop control and the clock restart control which are the specific features of the fourth embodiment of the present invention are explained. When the central processing unit 2 does not operate even once during a predetermined time, the central processing unit 2 provides the information to the clock stop control unit 42A via a signal wire 72A. The clock stop control unit 42A instructs the second clock generating unit 1A via a signal wire 46A. As the result, the second clock generating unit 1A stops the clock signal supply to the central processing unit 2.

On the other hand, if the clock restart control unit 43A receives the information that the central processing unit 2 has restarted the operation via the signal wire 73A, the clock restart control unit 43A instructs the clock stop control unit 42A to cancel the stop of the clock signal generation via a signal wire 47A. The clock stop control unit 42A instructs the clock generating unit 1 to restart the clock signal supply to the central processing unit 2 via the signal wire 46A. The clock restart control unit 43A may directly control the clock generating unit 1A to control the restart of the clock signal generation without controlling the restart of the clock generating unit 1A via the clock stop control unit 42A. The clock generating unit 1A supplies the clock signal to the central processing unit 2 via the clock signal wire 62.

The clock generating units 1 and 1A may control the frequency of the voltage control oscillator (VCO) to change the clock frequency, or may include a plurality of oscillators to select a clock frequency by selecting one of the oscillators.

According to the fourth embodiment of the present invention, the clock control type information processing apparatus of the fourth embodiment selects the clock frequencies of the peripheral processing units 31, 32 in response to the respective load states of the peripheral processing units 31, 32, at the same time controls to stop the operation of the central processing unit 2 completely while the central processing unit 2 has no load. Therefore, it is possible to reduce the electric power consumption of the information processing apparatus more effectively.

Embodiment 5

The clock control type information processing apparatus of the third embodiment of the present invention is constructed so that it increases the clock frequencies in the respective clock generating units when the load of the central processing unit 2 and the peripheral processing unit 31 or 32 increase, and reduces the clock frequencies in the respective clock generating units when the load of the peripheral processing unit 31 or 32 and the central processing unit 2 decreases, by monitoring the load state of the central processing unit 2 and the peripheral processing units 31 and 32. A clock control type information processing apparatus of a fifth embodiment of the present invention adds a function to stop the clock signal generation of the clock generating unit 1 when both the peripheral processing units 31 and 32 are inactive, and a function to restart the clock signal generation of the clock generating unit 1 when any one of the peripheral processing units 31 or 32 starts to operate.

Figure 7:
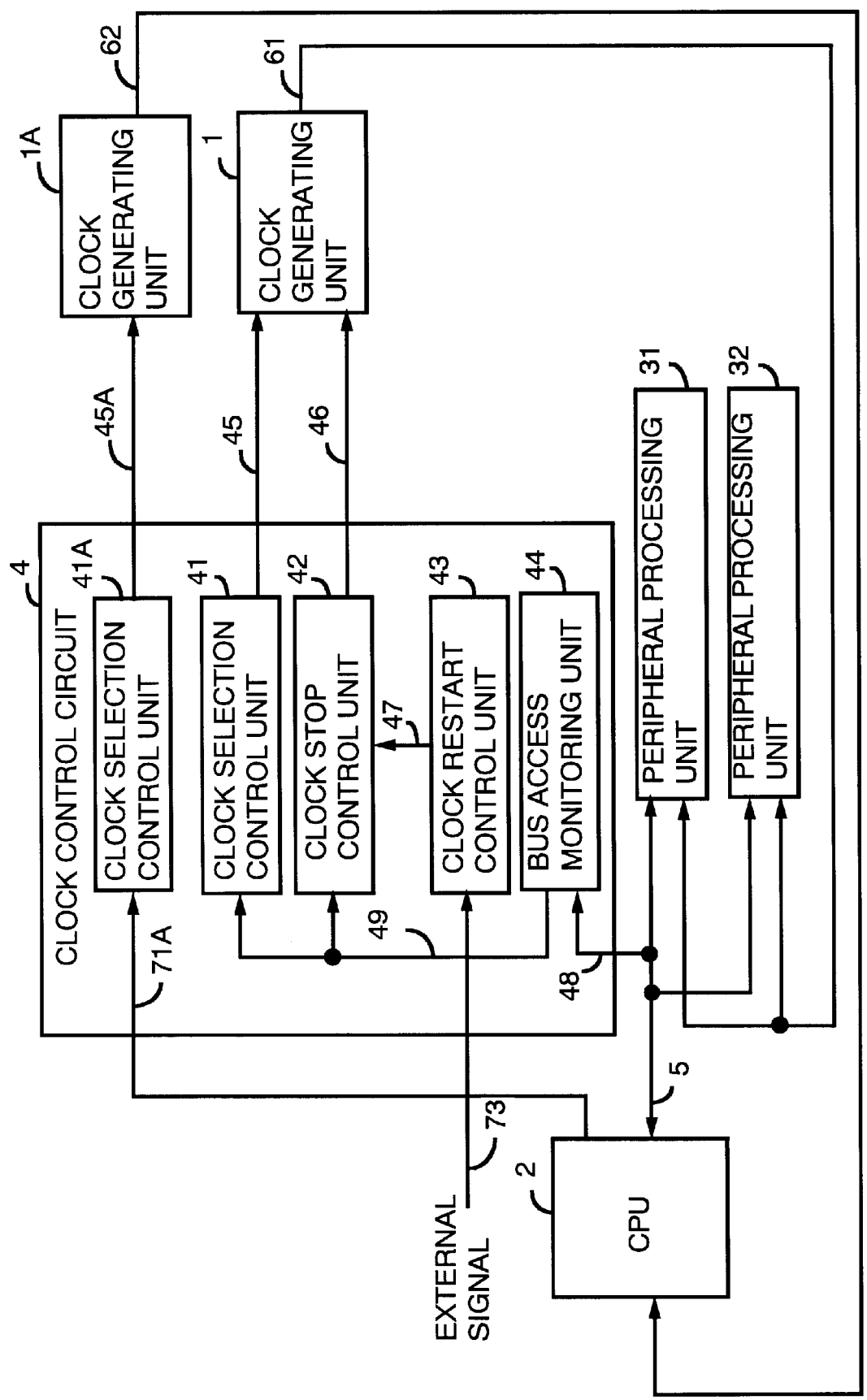
FIG. 7 is a block diagram of a clock control type information processing apparatus of a fifth embodiment of the present invention.

The clock control type information processing apparatus of the fifth embodiment of the present invention is explained in detail using FIG. 7. FIG. 7 is a block diagram showing a clock control type information processing apparatus of the fifth embodiment of the present invention. The clock control type information processing apparatus of FIG. 7 includes a first clock generating unit 1 for generating clocks signals having a plurality of different frequencies, a second clock generating unit 1A for generating clock signals having a plurality of different frequencies, a central processing unit (CPU) 2, peripheral processing units 31 and 32, a clock control circuit 4, a bus 5 for connecting the central processing unit 2 and peripheral processing units 31 and 32, a first clock signal wire 61 for sending the clock signals selected by the first clock generating unit 1, a second clock signal wire 62 for sending the clock signals selected by the second clock generating unit 1A, a first clock selection control unit 41 for selecting the clock frequency for the peripheral processing units 31, 32, a second clock selection control unit 41A for selecting the clock frequency for the central processing unit 2, a clock stop control unit 42 for controlling the stop of the clock signals to be generated in the clock generating unit 1, a clock restart control unit 43 for restarting the clock signal generation which has been stopped, a bus access monitoring unit 44 for monitoring the load state of the bus 5, a signal wire 45 for providing an output signal output from the first clock selection control unit 41, a signal wire 45A for providing an output signal output from the second clock selection control unit 41A, a monitor signal wire 48 for monitoring the bus 5, a control wire 49 for sending information signal from the bus access monitoring unit 44 and an external signal wire 73 for receiving external signal for restarting the generation of the clock signals supplied to the peripheral processing units 31 and 32.

The clock control type information processing apparatus of the fifth embodiment of the present invention monitors the load state of the peripheral processing units 31 and 32 and the central processing unit 2 to change the respective frequencies of the first and the second clock generating units. Therefore, it is possible to reduce the electric power consumption still more when the central processing unit 2 and the peripheral processing units 31, 32 are inactive.

Timing charts of a bus access in the fifth embodiment of the present invention are also shown in FIGS. 2A–2F as well as in the first embodiment of the present invention. The bus access monitoring unit 44 monitors the bus, and the clock selection control unit 41 controls the clock generating unit 1 to control the supply of the clock frequency to the peripheral processing units 31 and 32 based on the monitored result of the bus access monitoring unit 44. This operation is as same as that in the third embodiment, so the explanation thereof is omitted.

The clock stop control and the clock restart control which are the specific features of the fifth embodiment of the present invention are explained. When the bus access monitoring unit 44 does not detect any bus access during a predetermined time, the bus access monitoring unit 44 provides the information to the clock stop control unit 42 via a control wire 49. The clock stop control unit instructs the clock generating unit 1 to stop the clock via a signal wire 46. As the result, the first clock generating unit 1 stops the clock signal supply to the peripheral processing units 31 and 32.

On the other hand, if the clock restart control unit 43 receives the information that the peripheral processing unit 31 or 32 restarts the operation via the signal wire 73, the clock restart control unit 43 instructs the clock stop control unit 42 to cancel the stop of the clock signal generation via a signal wire 47. The clock stop control unit 42 instructs the clock generating unit 1 to start the clock signal supply to the peripheral processing unit 31 or 32 via the signal wire 46. The clock restart control unit 43 may directly control the clock generating unit 1 to control the restart of the clock signal generation without controlling the restart of the clock signal generation of the clock generating unit 1 via the clock stop control unit 42. The clock generating unit 1 supplies the clock signals to the peripheral processing unit 31 or 32 via the clock signal wire 61.

The clock generating units 1 and 1A may control the frequency of the voltage control oscillator (VCO) to change the generating frequency or may comprise a plurality of the oscillators to set the oscillation frequency by selecting one of the oscillators.

In the fifth embodiment of the present invention, the clock control type information processing apparatus selects the clock frequency of the central processing unit in response to the load state of the central processing unit, at the same time controls to stop the operation of the peripheral processing units completely while the peripheral processing units have no load. Therefore, it is possible to effectively reduce the electric power consumption of the information processing apparatus.

Embodiment 6

The clock control type information processing apparatus of the fifth embodiment of the present invention is constructed so that it increases the clock frequencies in the respective clock generating units when the load of the central processing unit 2 and the peripheral processing unit 31 or 32 increase, and reduces the clock frequencies in the respective clock generating units when the load of the peripheral processing unit 31 or 32 and the central processing unit 2 decreases by monitoring the load state of the peripheral processing units 31 and 32 and the central processing unit 2. Further it is constructed so that it stops completely the peripheral processing units 31, 32 when the peripheral processing units 31, 32 have no load, and restarts the operation of the peripheral processing units 31, 32 when the load occurred. A clock control type information processing apparatus of a sixth embodiment of the present invention adds a function to stop the clock signal generation of the clock generating unit 1A when the central processing unit 2 is inactive, and to restart the clock signal generation of the clock generating unit 1A when the central processing unit 2 starts to operate.

Figure 8:
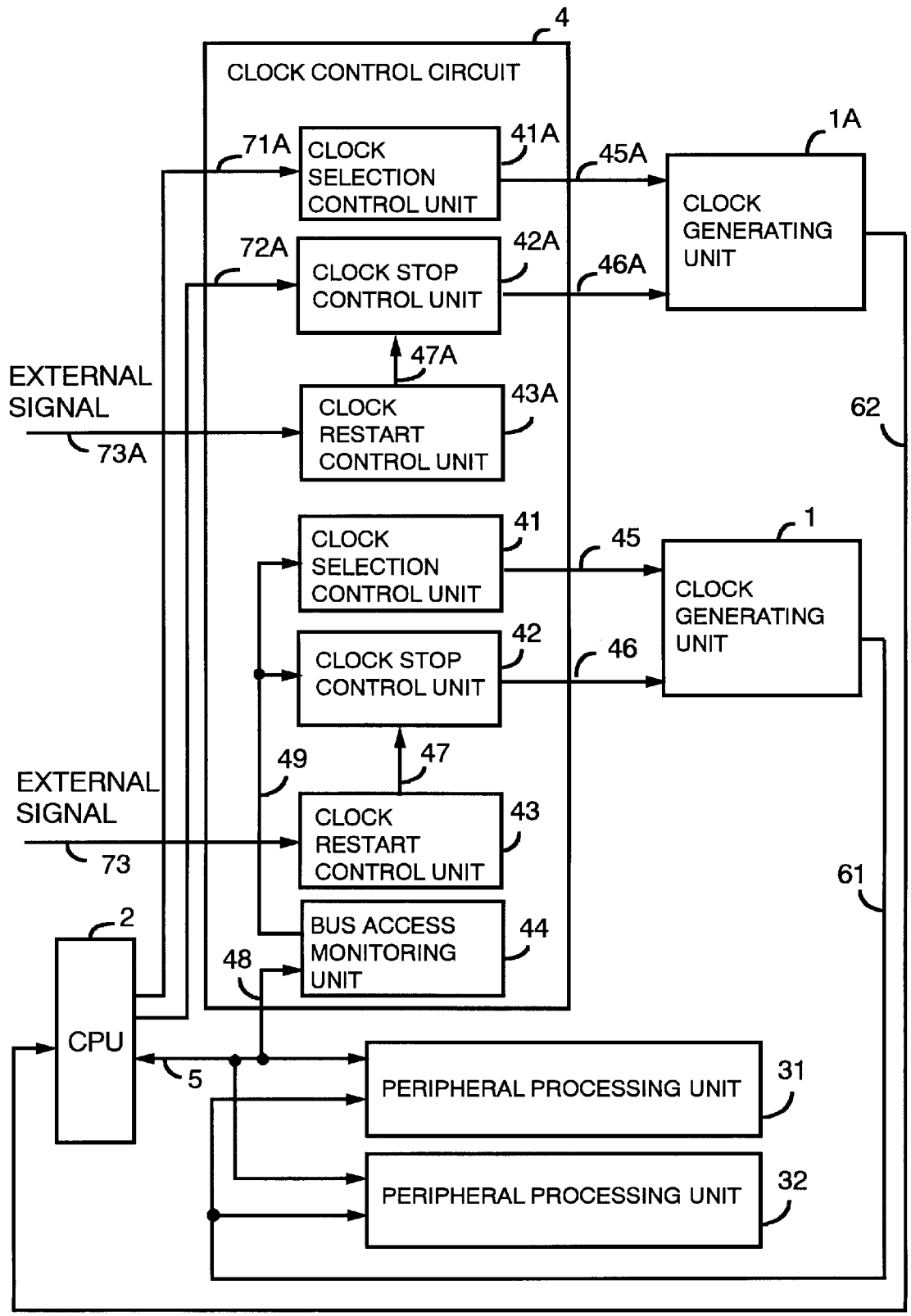
FIG. 8 is a block diagram of a clock control type information processing apparatus of a sixth embodiment of the present invention.
Figure 9:
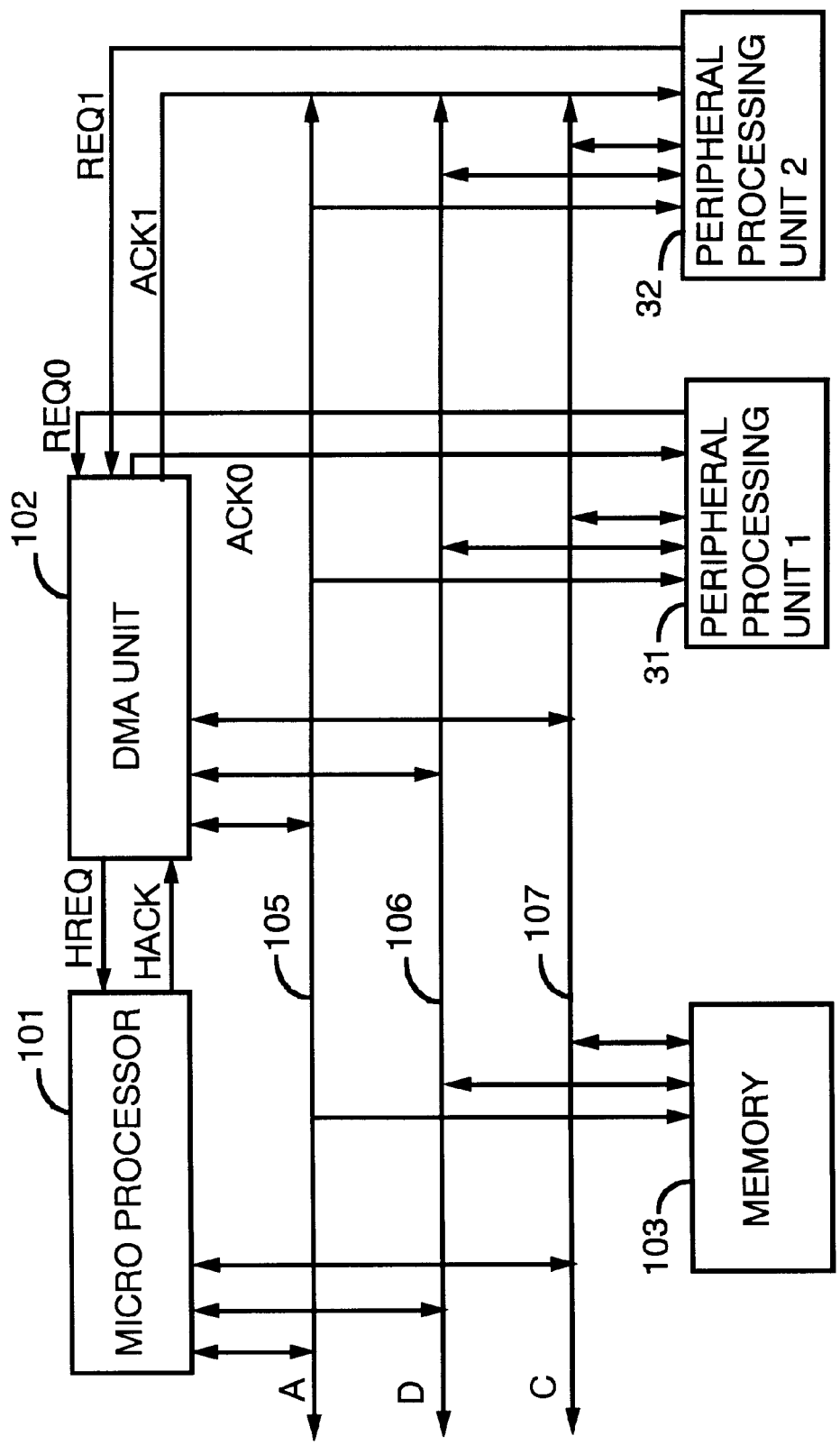
FIG 9 is a block diagram of a conventional information processing apparatus.
Figure 10:
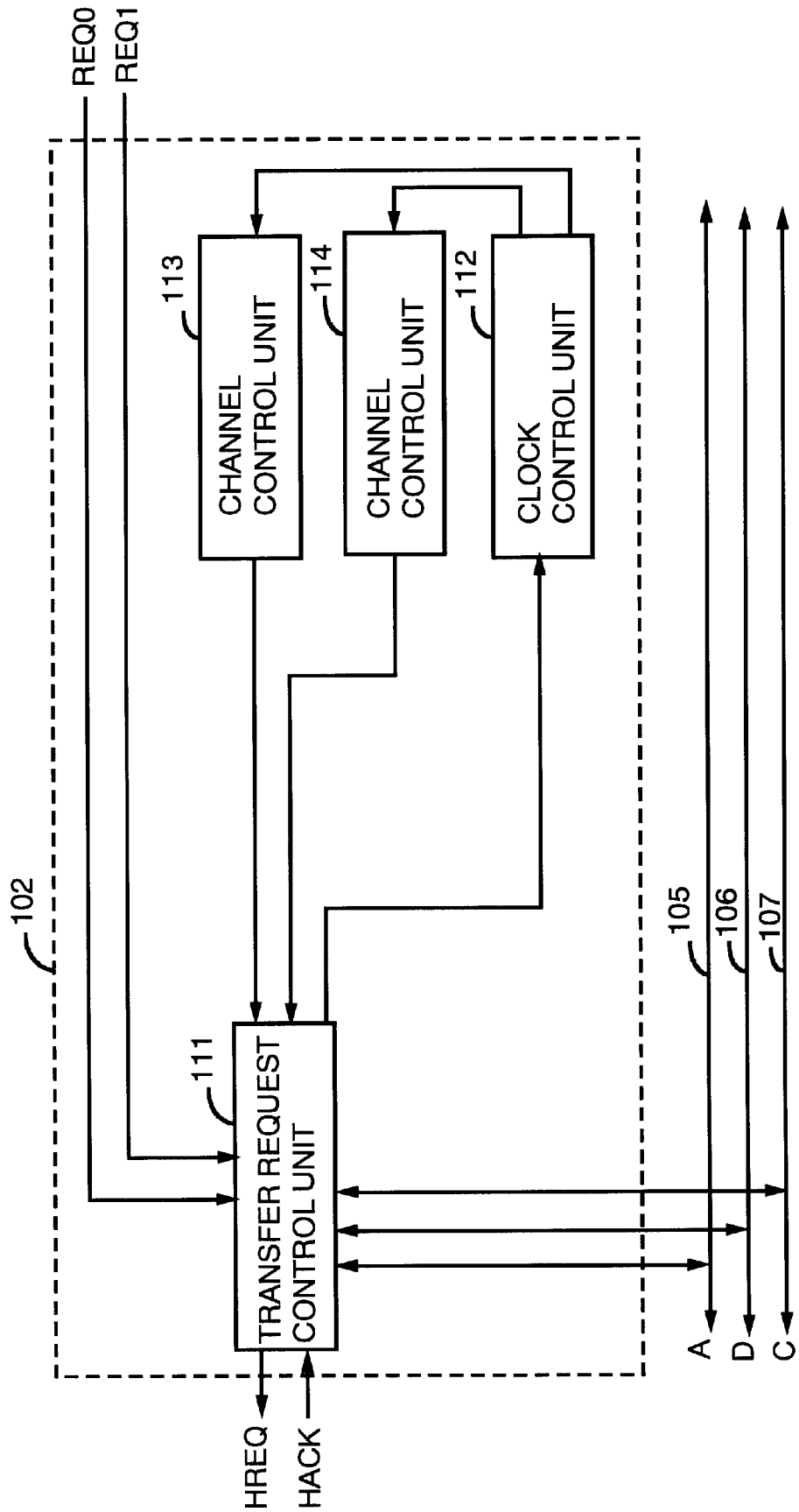
FIG. 10 is a block diagram of a DMA unit in the conventional information processing apparatus.

The clock control type information processing apparatus of the sixth embodiment of the present invention is explained in detail using FIG. 8. FIG. 8 is a block diagram showing a clock control type information processing apparatus of the sixth embodiment of the present invention. The clock control type information processing apparatus of FIG. 8 includes a first clock generating unit 1 for generating clock signal having a plurality of different frequencies, a second clock generating unit 1A for generating clock signal having a plurality of different frequencies, a central processing unit (CPU) 2, peripheral processing units 31 and 32, a clock control circuit 4, a bus 5 for connecting the central processing unit 2 and peripheral processing units 31 and 32, a first clock signal wire 61 for sending the clock signals selected by the first clock generating unit 1, a second clock signal wire 62 for sending the clock signals selected by the second clock generating unit 1A, a first clock selection control unit 41 for selecting the clock frequency for the peripheral processing units 31, 32, a second clock selection control unit 41A for selecting the clock frequency for the central processing unit 2, a clock stop control unit 42 for controlling the stop of the clock signals to be generated in the clock generating unit 1, a second clock stop control unit 42A for controlling the stop of the clock signals to be generated in the clock generating unit 1A, a first clock restart control unit 43 for restarting the clock signal supply to the peripheral processing unit 31 or 32, a second clock restart control unit 43A for restarting the clock signal supply to the central processing unit 2, a bus access monitoring unit 44 for monitoring the load state of the bus 5, a signal wire 45 for providing an output signal output from the first clock selection control unit 41, a signal wire 45A for providing an output signal output from the second clock selection control unit 41A, a signal wire 46 for providing an output signal output from the first clock stop control unit 42, a signal wire 46A for providing an output signal output from the second clock stop control unit 42A, a monitor signal wire 48 for monitoring the bus 5, a control wire 49 for sending information signal from the bus access monitoring unit 44, an external signal wire 73 for restarting the generation of the clock which is supplied to the peripheral processing units 31 and 32, and an external signal wire 73A for restarting the generation of the clock which is supplied to the central processing unit 2.

The clock control type information processing apparatus of the sixth embodiment of the present invention monitors the operating states of the peripheral processing units 31, 32 and the central processing unit 2 to change the frequencies of the respective clock generating units. Further, it stops the clock signals of the respective clock generating units when the peripheral processing units and the central processing unit are not operative and restarts the clock signal generation of the respective clock generating units when any one of the peripheral processing units or the central processing unit starts to operate. Therefore, it is possible to reduce the electric power consumption still more while the central processing unit and the peripheral processing units are both inactive.

Timing charts of a bus access in the sixth embodiment of the present invention are also shown in FIGS. 2A–2F as well as in the first embodiment of the present invention. The bus access monitoring unit 44 monitors the bus 5, and the clock selection control unit 41 controls the clock generating unit 1 according to the result from monitoring. Further, the clock selection control unit 41 stops or starts the clock signal generation of the clock generating unit due to the operative or inactive state of the peripheral processing units 31 and 32. This function is the same as that in the fifth embodiment, so the explanation thereof is omitted.

The clock stop control and the clock restart control which are the specific features of the sixth embodiment of the present invention are explained. When the peripheral processing units 31, 32 or the central processing unit 2 does not operate even once during a predetermined time, the peripheral processing units 31 and 32 provide the information to the clock stop control unit 42 via a control wire 49 according to the bus access monitoring result. On the other hand, the central processing unit 2 provides the information to the clock stop control unit 42A via a signal wire 72A. The clock stop control unit 42 and the clock stop control unit 42A instruct the first clock generating unit 1 and the second clock generating unit 1A of the clock stop, respectively, via the signal wire 46 and the signal wire 46A. As a result, the first clock generating unit 1 stops the clock signal supply to the peripheral processing units 31 and 32 and the second clock generating unit 1A stops the clock signal supply to the central processing unit 2.

On the other hand, if the clock restart control unit 43 or the clock restart control unit 43A respectively receive the information that the peripheral processing units 31 and 32 or the central processing unit 2 restart the operation via the signal wire 73 or the signal wire 73A, respectively, the clock restart control unit 43 instructs to cancel the stop of the clock signal generation to the clock stop control unit 42 via a signal wire 47 and the clock restart control unit 43A instructs to cancel the stop of the clock signal generation to the clock stop control unit 42A via a signal wire 47A. The clock stop control unit 42 instructs to start the clock signal supply to the peripheral processing unit 31 and 32 to the clock generating unit 1 via the signal wire 46. The clock stop control unit 42A instructs to start the clock signal supply to the central processing unit 2 to the clock generating unit 1A via the signal wire 46A. The clock restart control unit 43 and the clock restart control unit 43A may directly control the clock generating unit 1 and the clock generating unit 1A respectively to control the restart of the clock signal generation without controlling the restart of the clock signal generation of the clock generating unit 1 and the clock generating unit 1A via the clock stop control unit 42 and the clock stop control unit 42A, respectively. The clock generating unit 1 supplies the clock signals to the peripheral processing unit 31 and 32 via the clock signal wire 61 and the clock generating unit 1A supplies the clock signals to the central processing unit 2 via the clock signal wire 62.

The clock generating units 1 and 1A may control the frequency of the voltage control oscillator (VCO) to change the generating frequency or may comprise a plurality of the oscillators to set the oscillation frequency by selecting one of the oscillators.

According to the sixth embodiment of the present invention, the clock control type information processing apparatus selects the clock frequencies of the central processing unit 2 and the peripheral processing units 31, 32 respectively, in response to the load states of the central processing unit 2 and the peripheral processing units 31, 32. At the same time, it stops the central processing unit 2 or the peripheral processing units 31, 32 completely while the central processing unit 2 or the peripheral processing units 31, 32 have no load. Therefore, it is possible to effectively reduce the electric power consumption of the information processing apparatus.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A clock control type information processing apparatus including a central processing unit for executing programs and at least one peripheral processing unit connected to the central processing unit using a bus comprising:
   a clock generating unit for generating clock signals having a plurality of frequencies and selectively supplying any one of the clock signals to the central processing unit and the peripheral processing unit;
   a bus access monitoring unit for monitoring load state of the bus which connects the central processing unit with the peripheral processing unit; and
   a clock selection control unit for generating control signals to control the clock frequencies generated by the clock generating unit according to the load state of the bus such that one of at least a first, second, and third clock frequency is generated according to a corresponding first, second, and third load state of the bus.

2. The clock control type information processing apparatus of claim 1, further comprising:
   a clock stop control unit for instructing the clock generating unit to stop clock signal generation when the bus access monitoring unit detects no bus access on the bus for a predetermined time; and
   a clock restart control unit for instructing the clock generating unit to restart the clock signal generation in response to a restart signal when the clock signal generation is stopped.

3. The clock control type information processing apparatus of claim 1, wherein said clock generating unit sets oscillation frequencies by controlling the frequencies of a voltage controlling oscillator (VCO).

4. The clock control type information processing apparatus of claim 1, wherein said clock generating unit comprises a plurality of oscillators for setting a oscillation frequency by selecting one of said plurality of oscillators.

5. A clock control type information processing apparatus including a central processing unit for executing the programs and at least one peripheral processing unit connected to the central processing unit using a bus comprising:
   a first clock generating unit for generating clock signals having a plurality of frequencies and selectively supplying any one of the clock signals to the peripheral processing unit;
   a second clock generating unit for generating clock signals having a plurality of frequencies and selectively supplying any one of the clock signals to the central processing unit;
   a bus access monitoring unit for monitoring the load state of the bus which connects the central processing unit with the peripheral processing unit;
   a first clock selection control unit for generating control signals to switch clock frequencies of the first clock generating unit according to a load state of the bus; and
   a second clock selection control unit for generating control signals to switch clock frequencies of the second clock generating unit according to a load state of the central processing unit.

6. The clock control type information processing apparatus of claim 5, further comprising:
   a second clock stop control unit for instructing the second clock generating unit to stop clock signal generation when the central processing unit detects no load for more than a predetermined time; and
   a second clock restart control unit for instructing the second clock generating unit to restart the clock signal generation in response to a restart signal when the clock signal generation of the second clock generating unit is stopped.

7. The clock control type information processing apparatus of claim 5, wherein said clock generating unit sets oscillation frequencies by controlling the frequencies of a voltage controlling oscillator (VCO).

8. The clock control type information processing apparatus of claim 5, wherein said first generating unit comprises a plurality of oscillators for setting a oscillation frequency by selecting one of said plurality of oscillators.

9. The clock control type information processing apparatus of claim 5, wherein said second generating unit comprises a plurality of oscillators for setting a oscillation frequency by selecting one of said plurality of oscillators.

10. The clock control type information processing apparatus of claim 5, further comprising:

a first clock stop control unit for instructing said first clock generating unit to stop the clock signal generation when the bus access monitoring unit detects no bus access on the bus for more than a predetermined time; and a clock restart control unit for instructing the first clock generating unit to restart the clock signal generation in response to a restart signal when the clock signal generation of the first clock generating unit is stopped.

11. The clock control type information processing apparatus of claim 10, further comprising:

a second clock stop control unit for instructing said second clock generating unit to stop the clock signal generation when said central processing unit detects no load for more than a predetermined time; and a second clock restart control unit for instructing the second clock generating unit to restart the clock signal generation in response to a restart signal when the clock signal generation of the second clock generating unit is stopped.

12. A method of controlling a clock and information processing apparatus having a central processing unit and at least one peripheral processing unit operatively connected to the central processing unit with a bus, comprising:

generating a clock signal having a variable frequency;

supplying the clock signal to the central processing unit and the peripheral processing unit;

monitoring a load state of the bus; and controlling said generating step to vary the clock signal frequency according to the load state of the bus as determined by said monitoring step such that one of at least a first, second, and third clock frequency is generated according to a corresponding first, second, and third load state of the bus.

13. The method according to claim 12, further comprising:

instructing said generating step to stop clock signal generation when said monitoring step detects no bus access on the bus for a predetermined time; and instructing said generating step to restart the clock signal generation in response to a restart signal when the clock signal generation has been stopped.

14. A method of controlling clock signals in an information processing apparatus having a central processing unit and a peripheral processing unit operatively connected to the central processing unit via a bus, comprising:

generating a first clock signal having a variable frequency;

supplying the first clock signal to the peripheral processing unit;

generating a second clock signal having a variable frequency;

supplying the second clock signals to the central processing unit;

monitoring a load state of the bus;

controlling said generating first clock signal step to vary the first clock signal frequency according to the load state of the bus as determined by said monitoring step; and controlling said generating second clock signal step to vary the frequency of the second clock signal according to a load state of the central processing unit.

15. The method according to claim 14, further comprising:

instructing said generating second clock signal step to stop generating the second clock signal when the central processing unit has no load for more than a predetermined time; and instructing said generating second clock step to restart generation of the second clock signals in response to a restart signal when the second clock signal generation has been stopped.

16. The method according to claim 14, further comprising:

instructing said generating first clock step to stop the generation of the first clock signal when said monitoring step detects no bus access on the bus for more than a predetermined time; and instructing said generating first clock step to restart generation of the first clock signal in response to a restart signal.

17. The method according to claim 14, further comprising:

instructing said generating second clock step to stop generating the second clock signal when the central processing unit is under no load for more than a predetermined time; and instructing said generating second clock step to restart generating the second clock signal in response to a restart signal.

* * * * *